(12) United States Patent
Burton

(10) Patent No.: US 9,310,534 B2
(45) Date of Patent: Apr. 12, 2016

(54) CABLE BARRIER REFLECTOR WRAP DEVICE

(71) Applicant: J Brent Burton, Fishers, IN (US)

(72) Inventor: J Brent Burton, Fishers, IN (US)

( * ) Notice: Subject to any disclaimer, the term of this patent is extended or adjusted under 35 U.S.C. 154(b) by 61 days.

(21) Appl. No.: 14/249,284

(22) Filed: Apr. 9, 2014

(65) Prior Publication Data

US 2014/0307318 A1  Oct. 16, 2014

Related U.S. Application Data

(60) Provisional application No. 61/810,601, filed on Apr. 10, 2013.

(51) Int. Cl.
*G02B 5/12* (2006.01)
*E01F 15/06* (2006.01)

(52) U.S. Cl.
CPC .. *G02B 5/12* (2013.01); *E01F 15/06* (2013.01)

(58) Field of Classification Search
CPC ......... G02B 5/128; G02B 5/132; E01F 9/044; E01F 9/03

USPC .......................... 359/518, 538, 540, 551, 552
See application file for complete search history.

(56) References Cited

U.S. PATENT DOCUMENTS

| | | | | |
|---|---|---|---|---|
| 4,035,059 A | * | 7/1977 | DeMaster | E01F 9/044 359/538 |
| 4,815,818 A | * | 3/1989 | Thomas | E01F 9/03 359/518 |

* cited by examiner

*Primary Examiner* — Euncha Cherry
(74) *Attorney, Agent, or Firm* — John D Ritchison; Ritchison Law Offices, PC

(57) ABSTRACT

An apparatus for providing a reflector wrap on a highway cable barrier. The device solves a limitation currently found with the cable system—visibility. The cable barrier reflector wrap is comprised of a support structure to support a reflective object, the structure having an open end and a slit or aperture longitudinal to the structure; a reflective surface structure; and a manner to secure the reflective surface structure to the support structure whereby the cable barrier reflective device is connected to items including a cable barrier system, sign posts, fences and other barrier structures to improve and enhance the reflectivity and improve the visibility of the items.

5 Claims, 10 Drawing Sheets

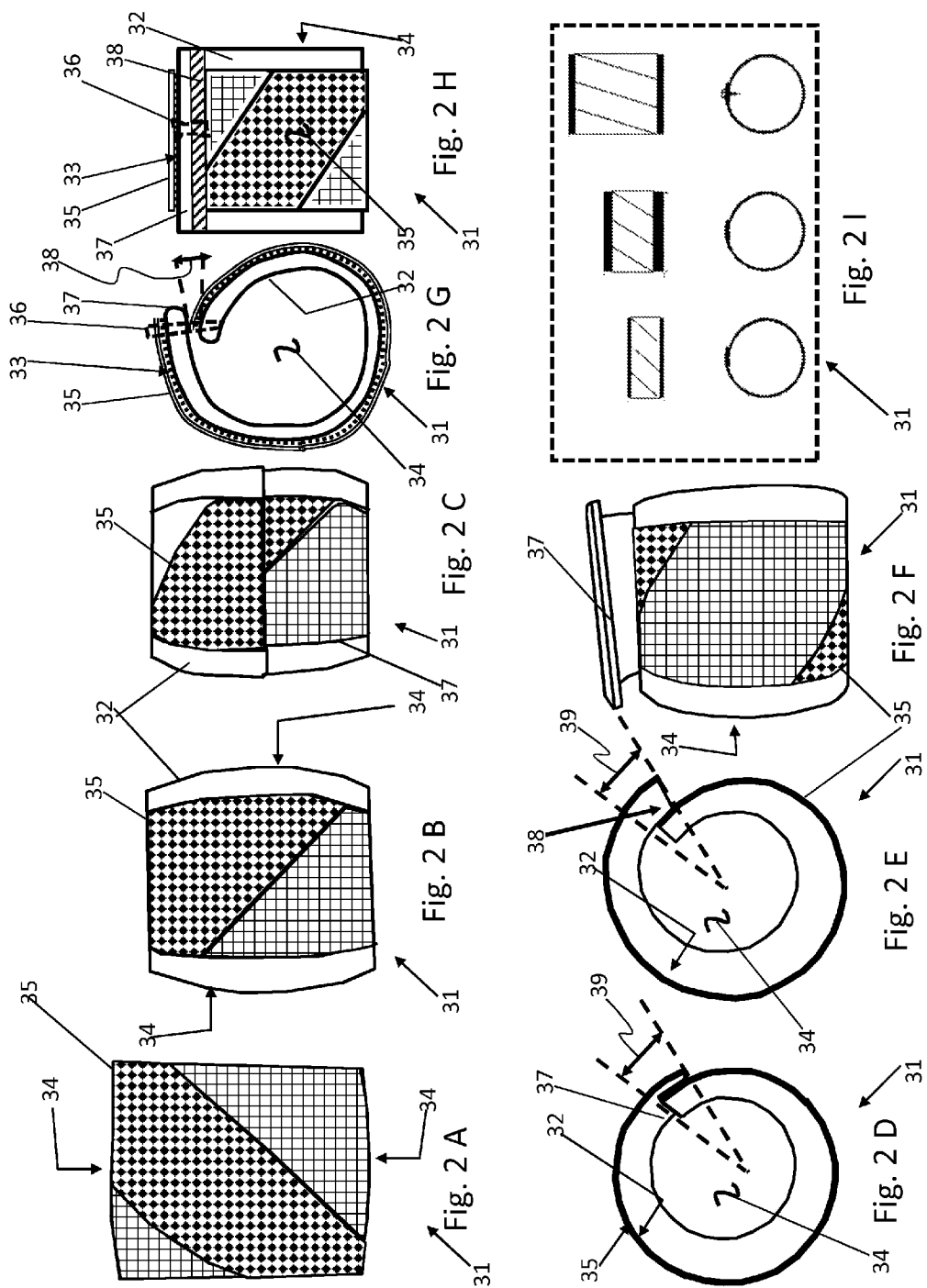

Figure 1C:
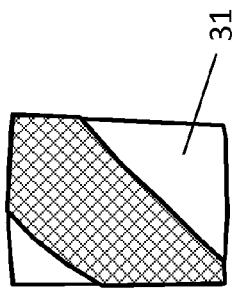
Figure 1B:
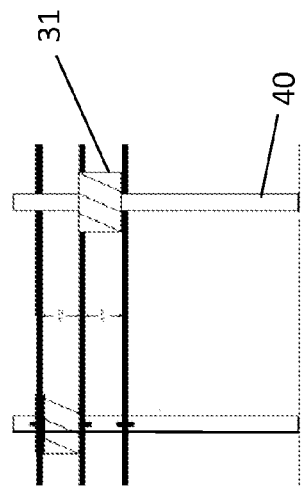
Figure 1E:
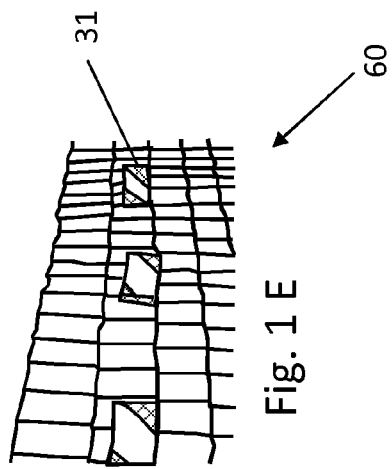
Figure 1A:
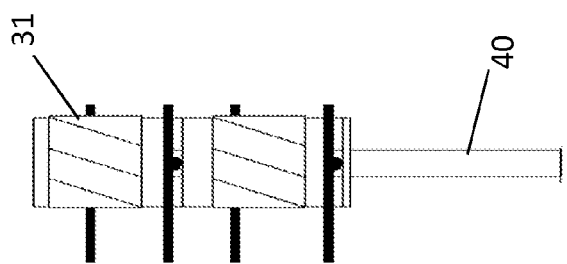
Figure 1D:
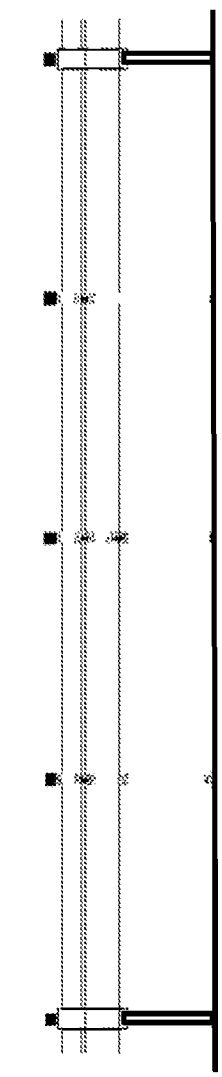

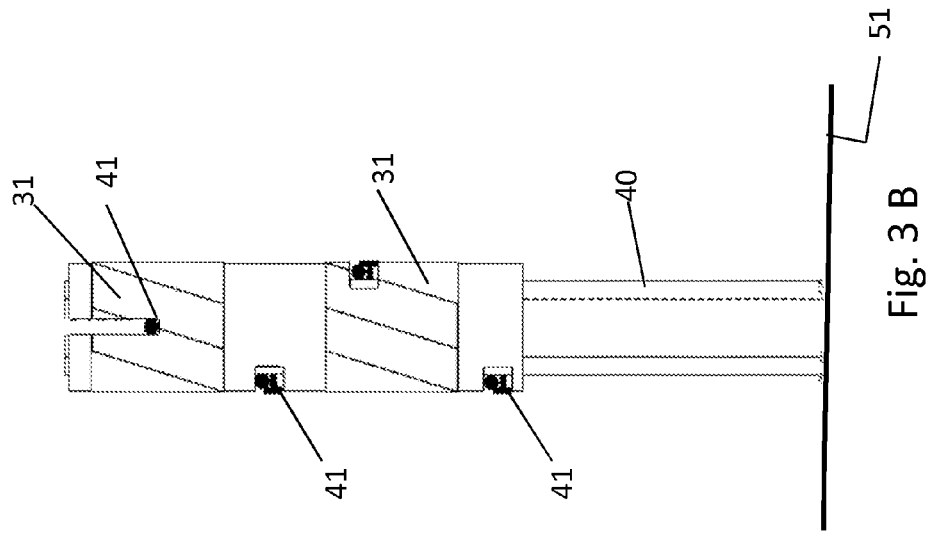
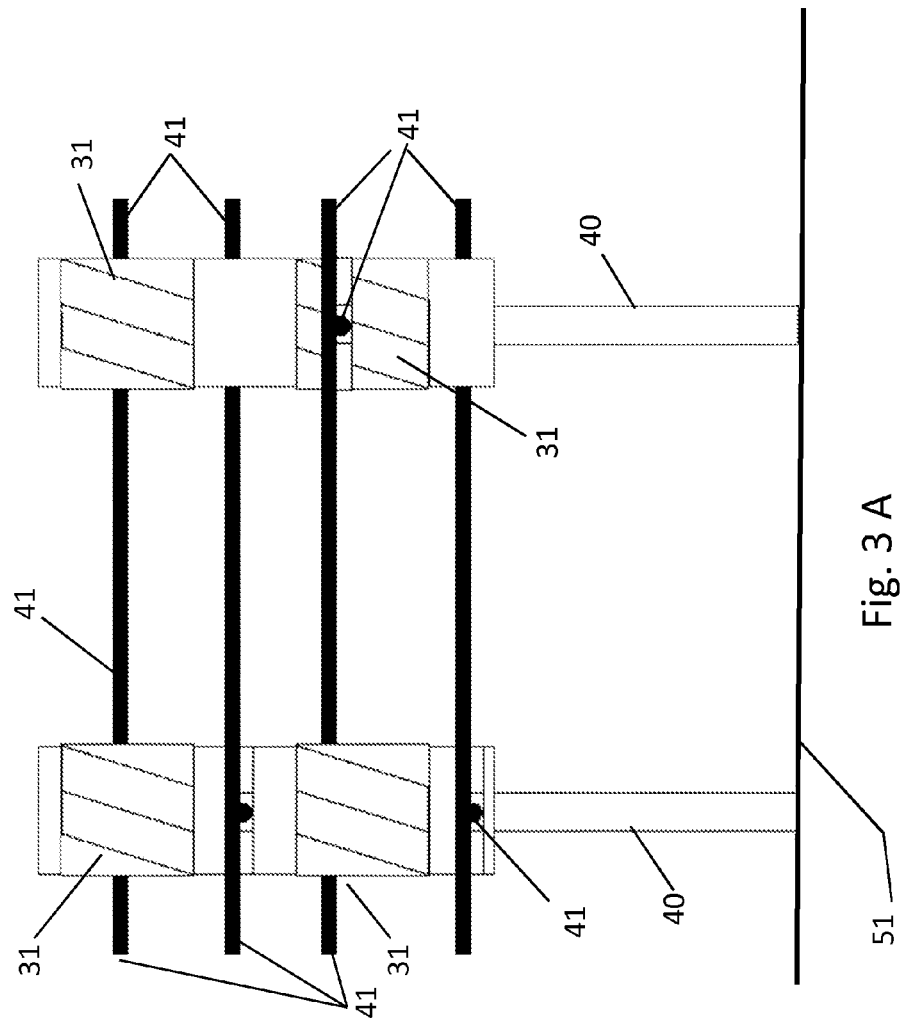

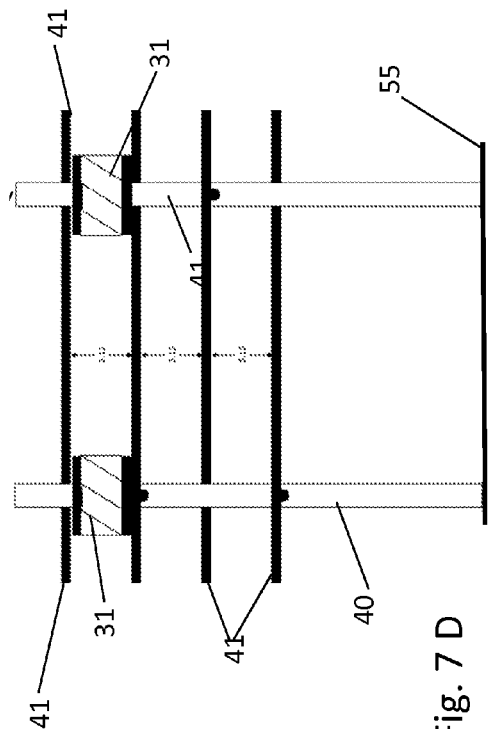
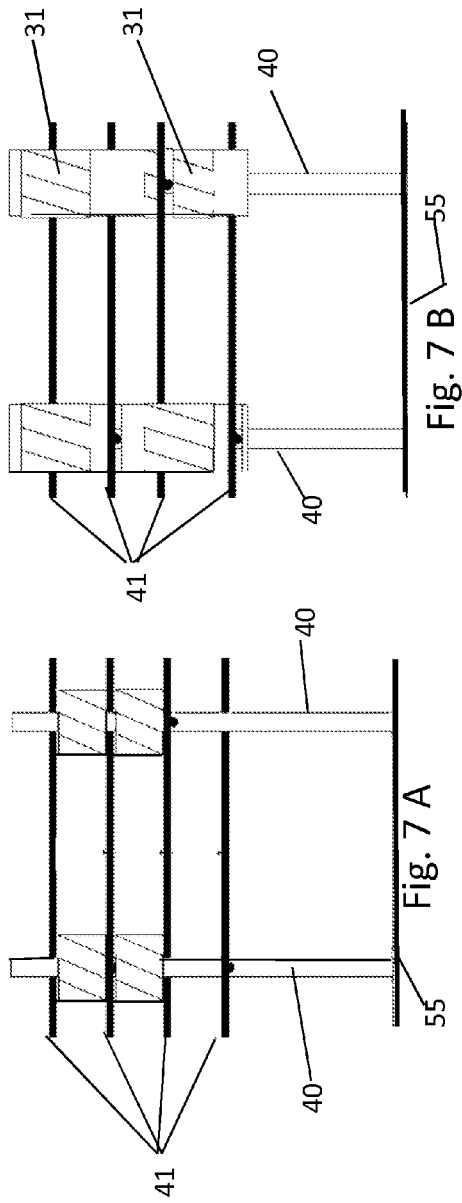
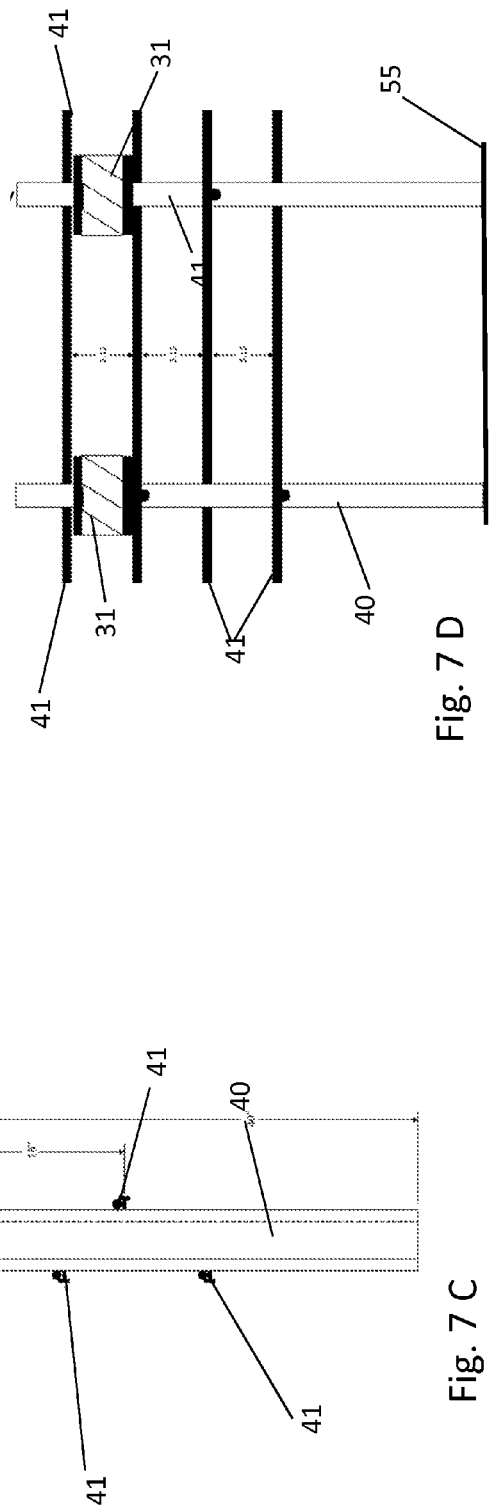
Fig. 7 A
Fig. 7 B
Fig. 7 C
Fig. 7 D

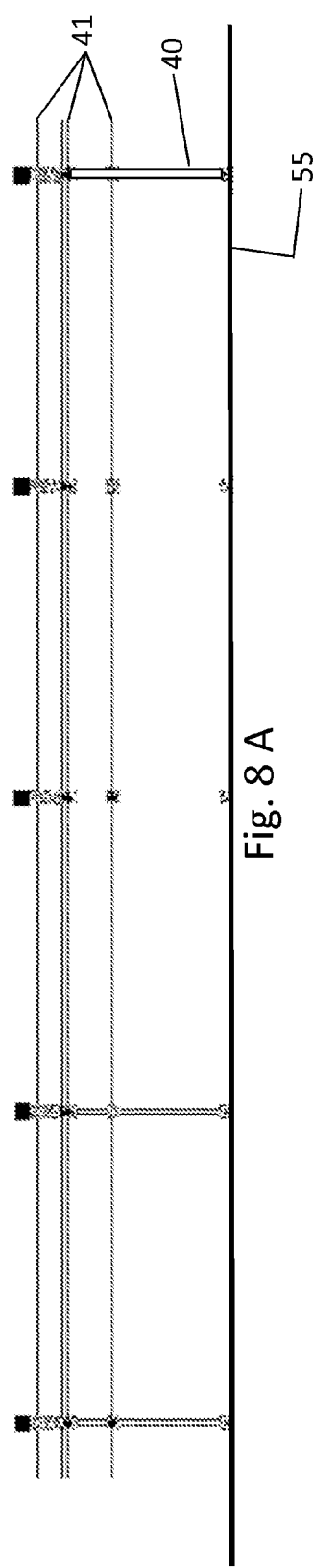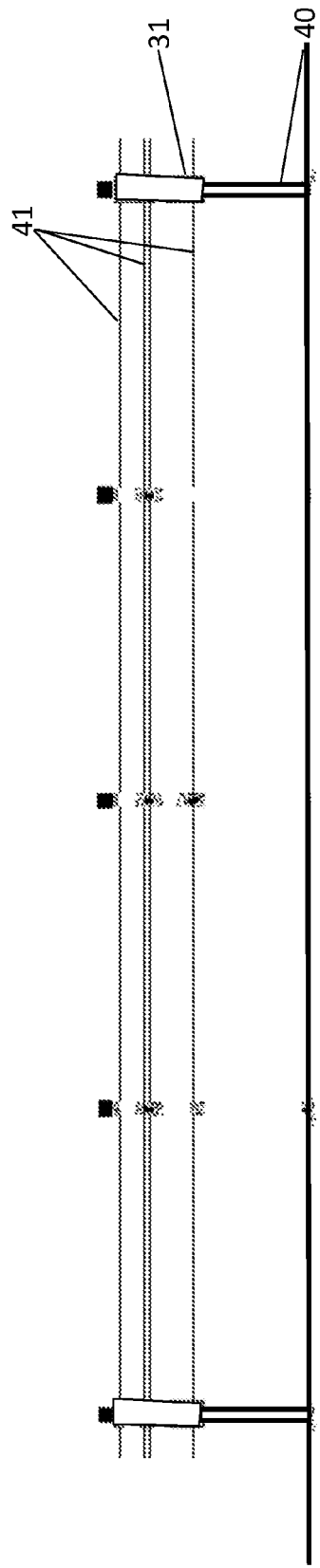
Fig. 8 A
Fig. 8 B

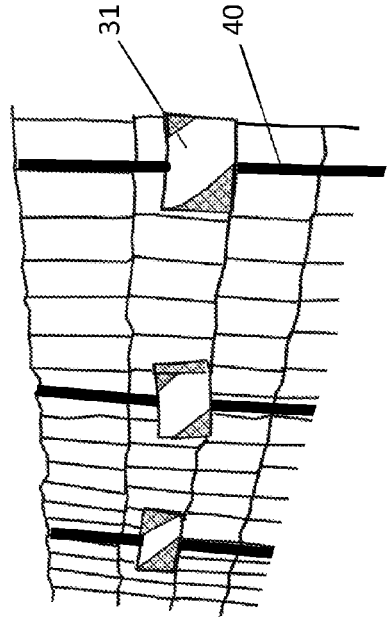
Fig. 9 A
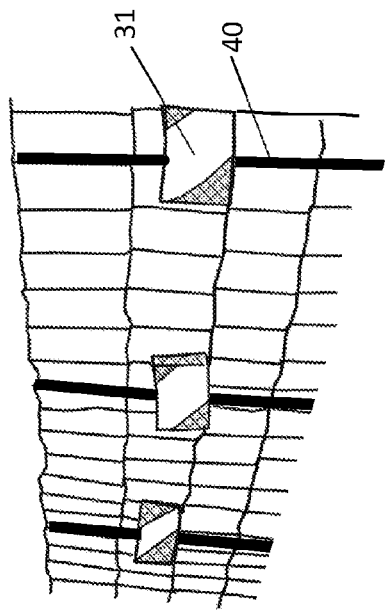
Fig. 9 B
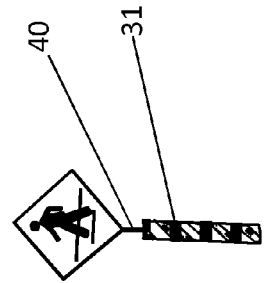
Fig. 9 C
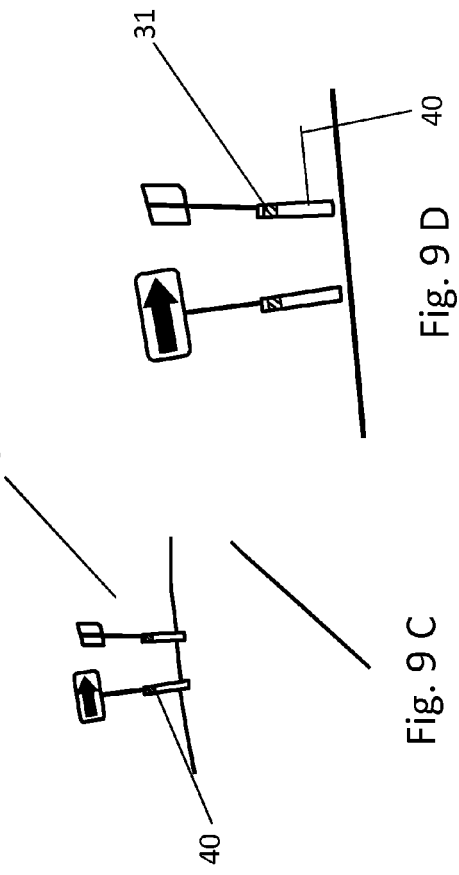
Fig. 9 D
Fig. 9 E

CABLE BARRIER REFLECTOR WRAP DEVICE

CROSS-REFERENCE TO RELATED APPLICATIONS

This application claims the benefit of Provisional Patent Application Ser. No. 61/810,601 filed Apr. 10, 2013 by J. Brent Burton and entitled "Cable Barrier Reflector Wrap Device".

FIELD OF INVENTION

This invention relates to a Cable Barrier Reflector Wrap Device. The present disclosure is related to highway barriers and safety systems and more particularly to improved visibility of the cable safety systems and associated posts.

BACKGROUND OF THE DISCLOSURE

Guardrails are traffic barriers placed along roadsides to screen errant vehicles from hazards behind the barrier. A common guardrail in the U.S. is constructed using a standard steel W-beam or three-beam mounted on spaced wood or steel posts. Alternative guardrail installation designs incorporate a box beam rail member wherein the rail member may be a tubular beam member having a square or rectangular cross-section. Another type of highway safety device is cable safety systems and cable barriers, which have been installed along edges of roadways and highways for many years. Cable safety systems and cable barriers have also been installed along medians between roadways and/or highways. Cable safety systems generally include one or more horizontal cables attached to support posts. For some applications cable safety systems and cable barriers may reduce damage to an impacting vehicle and/or injury to occupants of the impacting vehicle as compared with other types of highway safety systems and highway barriers.

Cable safety systems are often designed and installed with at least one cable mounted horizontally on a plurality of generally vertical support posts. The number of cables may vary depending on various factors such as the type of vehicles using the associated roadway and the hazard which required installation of the cable safety system.

Problem Solved

The limitation found with the cable system is visibility. Unlike the surface of guardrails, the small cable diameters do not lend themselves to much of a reflective surface for an alert system to vehicle drivers. This Cable Barrier Reflector Wrap device invention addresses these problems by providing an easy way to increase the reflective surface on the cable system and provide significantly more visibility to the system. The device permits a 360 degree reflection unlike the limited "flat" surfaces of standard guardrails and signage.

Prior Art

This section is not Applicable to Provisional Applications. However, as far as known, there are no Cable Barrier Reflector Wrap device or the like. It is believed that this product is unique in its design and technologies.

SUMMARY OF THE INVENTION

This new device/process may be simply described as a Cable Barrier Reflector Wraps device. The preferred embodiment is a cable barrier reflector wrap comprised of: (a). a support structure to support a reflective object, the structure having an open end and a slit or aperture longitudinal to the structure; (b). a reflective surface structure; and (c). a means to secure the reflective surface structure to the support structure whereby the cable barrier reflective device is connected to items including a cable barrier system, sign posts, fences and other barrier structures to improve and enhance the reflectivity and improve the visibility of the items.

OBJECTS AND ADVANTAGES

There are several objects and advantages of the Cable Barrier Reflector Wrap device. There are currently no known reflective devices that are effective at providing the objects of this invention. The advantages and benefits are shown as:

| Item | Advantages |
| --- | --- |
| 1 | Permits more visibility |
| 2 | Installs as new or retrofit |
| 3 | Is lightweight |
| 4 | Can be manufactured from common materials |
| 5 | Can be manufactured with recycled materials (green) |
| 6 | Can be installed without special tools |

Finally, other advantages and additional features of the present Cable Barrier Reflector Wrap device will be more apparent from the accompanying drawings and from the full description of the device. For one skilled in the art of reflective devices for guardrail, cable systems, signage and the like, it is readily understood that the features shown in the examples with this product are readily adapted to other types of reflective surface systems and devices.

DESCRIPTION OF THE DRAWINGS—FIGURES

The accompanying drawings, which are incorporated in and constitute a part of this specification, illustrate an embodiment of the device that is preferred. The drawings together with the summary description given above and a detailed description given below serve to explain the principles of the Cable Barrier Reflector Wrap device. It is understood, however, that the Cable Barrier Reflector Wrap device is not limited to only the precise arrangements and instrumentalities shown.

FIGS. 1 A through 1 E are sketches of the general reflector devices for safety cable and street sign applications device.

FIGS. 2 A through 2 I are sketches of the general Cable Barrier Reflector Wrap device with features and specific configurations shown.

FIGS. 3 A and 3 B are sketches of the general reflective cable bollard device with components and features noted.

Figure 4:
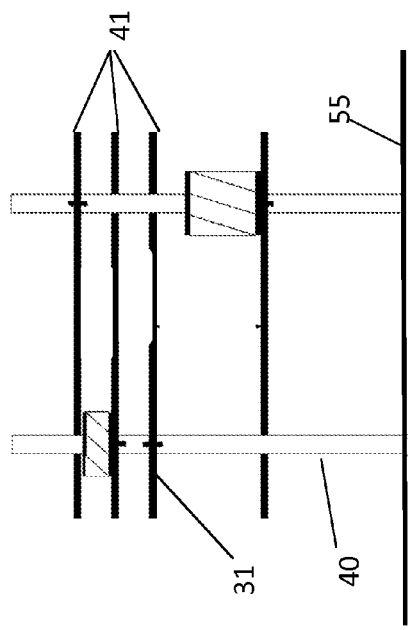
Figure 4:
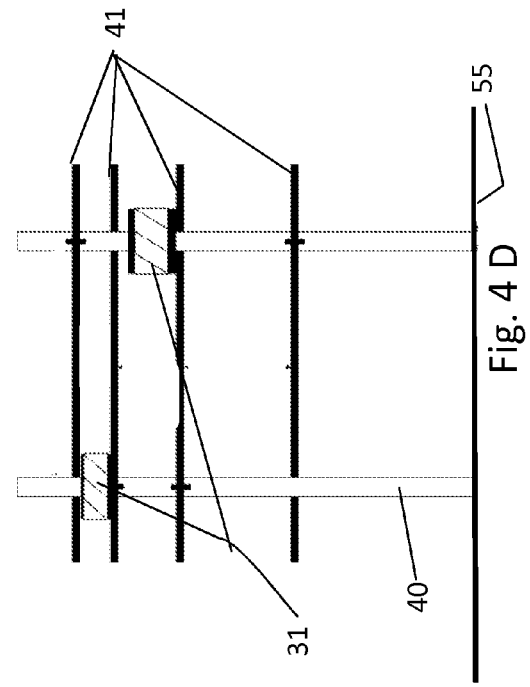
Figure 4:
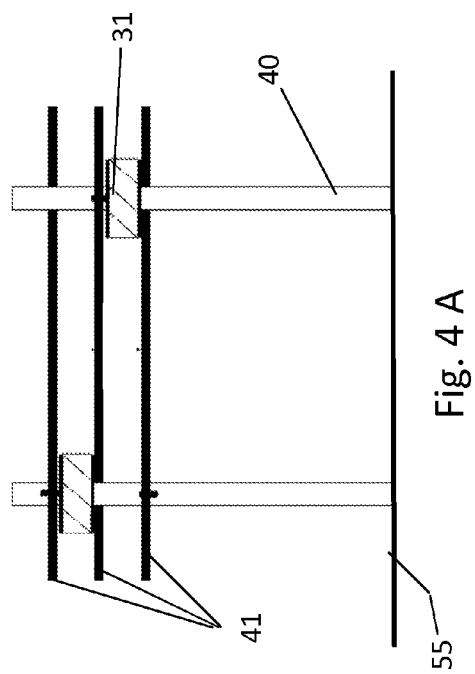
Figure 4:
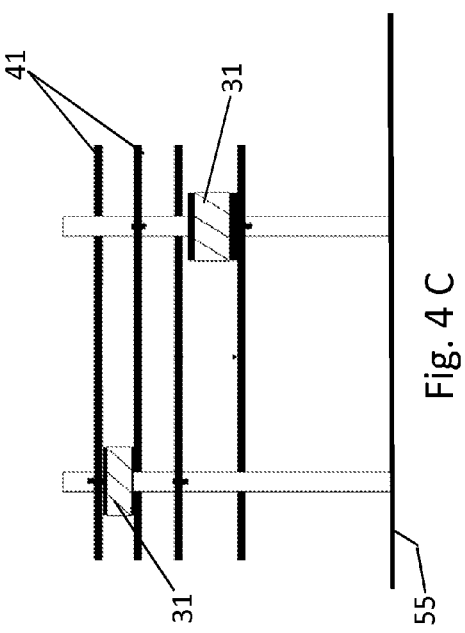

FIGS. 4 A through 4 D are sketches of the reflective device for a Nucor application with the components and features shown from generally a top view.

Figure 5:
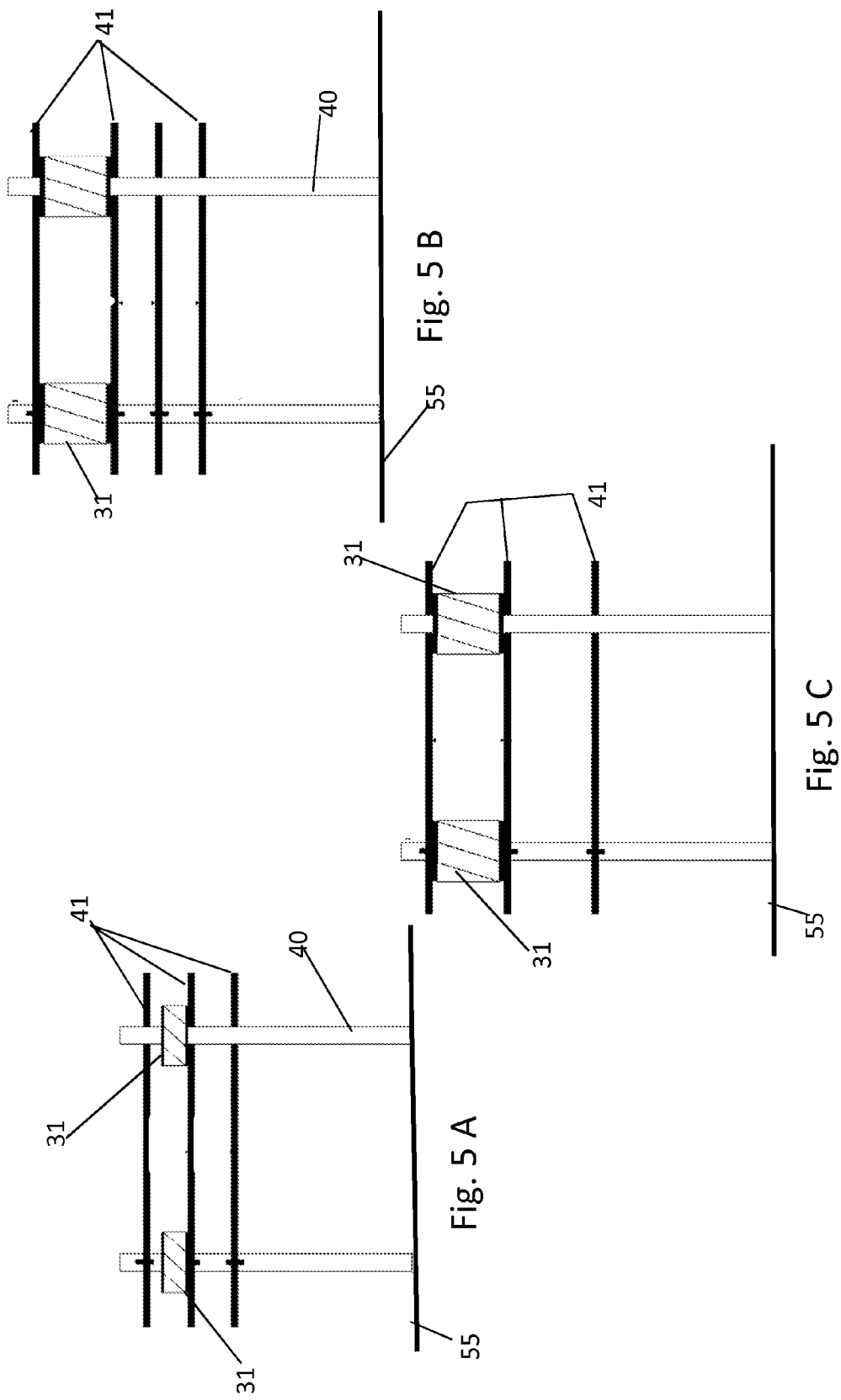

FIGS. 5 A through 5 C are sketches of the reflective device for a Gibraltar application.

Figure 6:
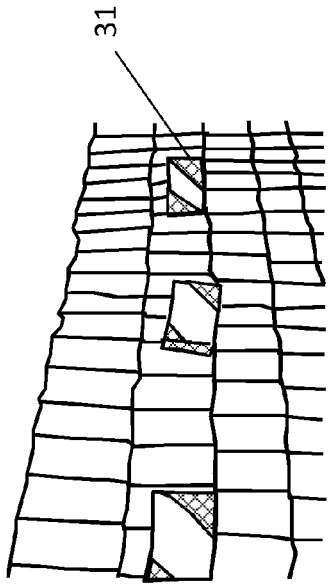
Figure 6:
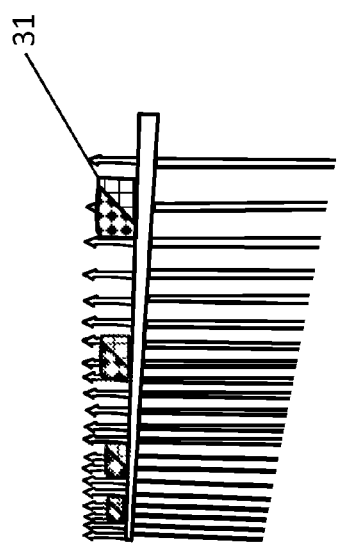
Figure 6:
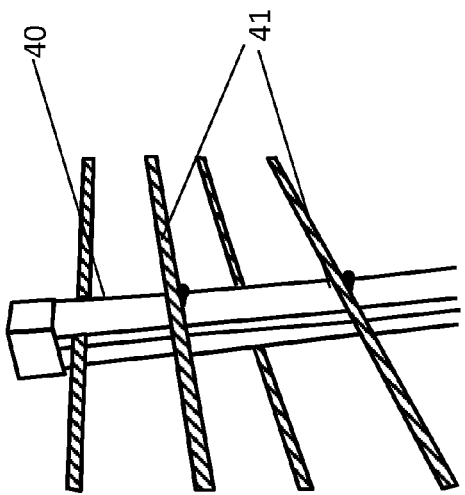

FIGS. 6 A through 6 C are sketches of storage companies, fence, and highway applications.

FIGS. 7 A through 7 D are sketches of the reflective device for a Brifen application.

FIGS. 8 A and 8 B are additional applications with Brifen barrier.

FIGS. 9 A through 9 E are photos of the reflective device with fence, highway and intersection applications.

Figure 10:
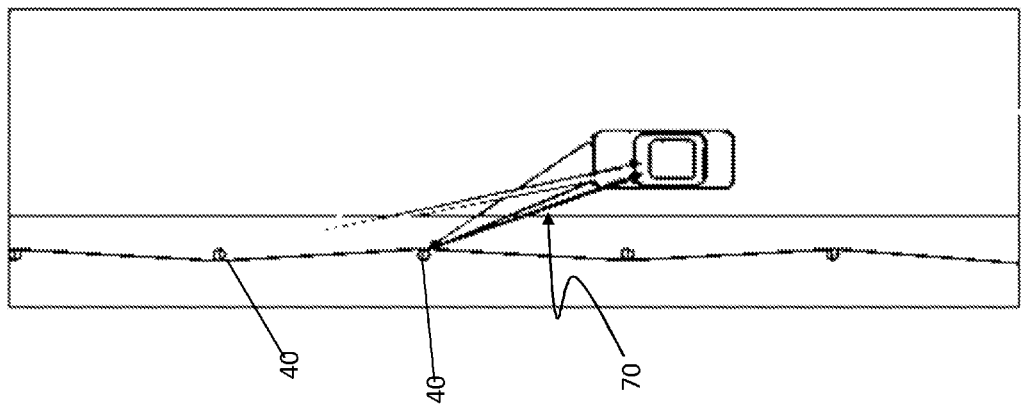
Figure 10:
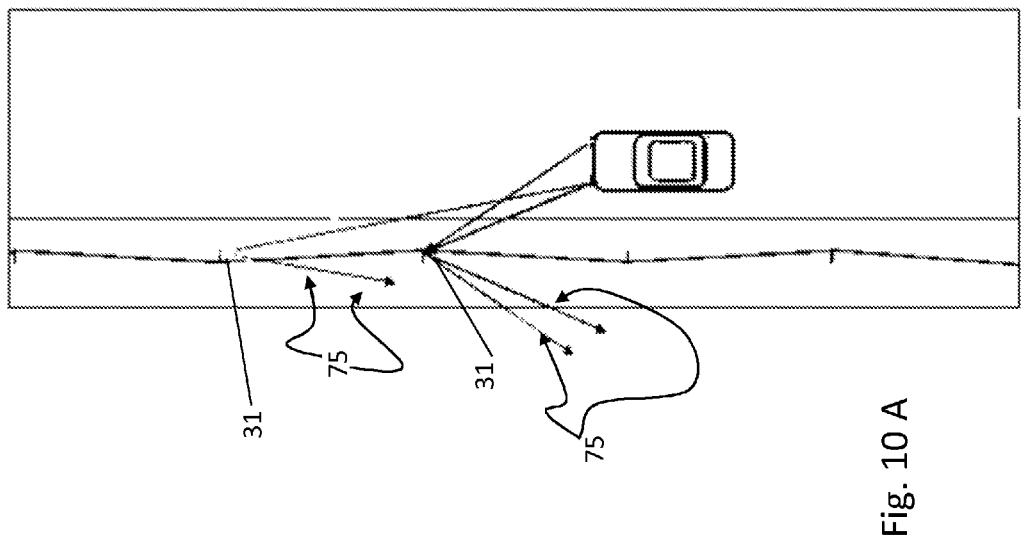

FIGS. 10 A and 10 B are sketches of the reflective device with fence, highway and intersection applications.

DESCRIPTION OF THE DRAWINGS—REFERENCE NUMERALS

The following list refers to the drawings:

TABLE A

Reference numbers

| Ref # | Description |
|---|---|
| 31 | Reflective Device |
| 32 | Structure - pipe, tube (square, circular, rectangular, or other regular or irregular polygon), or the like |
| 33 | Means 33 for attaching reflective surface 35 to structure 32 - means such as adhesive, glue, heat seal or the like |
| 34 | Open end 34 of the device 31 |
| 35 | Reflective surface 34 such as reflective tape, honeycomb tape or paint or equal |
| 36 | Optional means 36 for connecting gap - screw, adhesive, tape, heat or the like |
| 37 | Aperture 37 or slice along longitudinal direction of the device 31 |
| 38 | Gap 38 at overlap 39 and aperture 37 |
| 39 | Overlap 39 of the structure 32 once the aperture 37 is completed/cut/formed |
| 40 | Post |
| 41 | Cable |
| 50 | Series of Posts |
| 55 | Ground |
| 60 | Fence System |
| 70 | Reflection from post 40 or cable 41 |
| 75 | Reflection from device 31 |

DETAILED DESCRIPTION OF PREFERRED EMBODIMENT

The present development is a Cable Barrier Reflector Wrap Device. The embodiment is related to highway barriers and safety systems and more particularly to improved visibility of the cable safety systems and associated posts. This Cable Barrier Reflector Wrap device invention addresses visibility problems of common guardrail and cable systems by providing an easy way to increase the reflective surface on the cable system and provide significantly more visibility to the system. The device permits a 360 degree reflection unlike the limited "flat" surfaces of standard guardrails and signage.

There is shown in FIGS. 1-10 a description and operative embodiment of the Cable Barrier Reflector Wrap device. In the drawings and illustrations, one notes well that the FIGS. 1-2 demonstrate the general configuration, and FIGS. 3-10 show examples but not limitations of use for the Cable Barrier Reflector Wrap device. The various example uses are in the operation and use section, below.

The accompanying drawings, which are incorporated in and constitute a part of this specification, illustrate an embodiment of the Cable Barrier Reflector Wrap device 31 that is preferred. The drawings together with the summary description given above and a detailed description given below serve to explain the principles of the Cable Barrier Reflector Wrap device 31.

The advantages and benefits of the device 31 are:
Permits more visibility
Installs as new or retrofit
Is lightweight
Can be manufactured from common materials
Can be manufactured with recycled materials (green)
Can be installed without special tools The preferred embodiment is a cable barrier reflector wrap 31 comprised of:
a. a support structure 32 to support a reflective object 35, the structure having an open end 34 and a slit 37 or aperture longitudinal to the structure 32;
b. the reflective surface structure 35; and
c. a means 33 to secure the reflective surface 35 structure to the support structure 32 whereby the cable barrier reflective device 31 is connected to items including a cable barrier system 41, sign posts 40, fences 60 and other barrier structures to improve and enhance the reflectivity and improve the visibility of the items.

FIGS. 1 A through 1 E are sketches of the general reflector devices for safety cable and street sign applications device. FIG. 1 A shows a reflective device 31 on a post 40. FIG. 1 B shows a reflective device 31 on a post 40 as a two post system. FIG. 1 C shows a reflective device 31. FIG. 1 D shows series of posts 50. FIG. 1 E shows a reflective device 31 on a fence system 60. These are discussed further in the operation section below.

FIGS. 2 A through 2 I are sketches of the general Cable Barrier Reflector Wrap device 31 with features and specific configurations shown. Shown in these various views are the reflective device 31; structure 32—pipe, tube (square, circular, rectangular, or other regular or irregular polygon), or the like; means 33 for attaching reflective surface 35 to structure 32—means such as adhesive, glue, heat seal or the like; open end 34 of the device 31; reflective surface 35 such as reflective tape, honeycomb tape or paint or equal; optional means 36 for connecting gap 38—screw, adhesive, tape, heat or the like; aperture 37 or slice along longitudinal direction of the device 31; gap 38 at overlap 39 and aperture 37; and an overlap 39 of the structure 32 once the aperture 37 is completed/cut/formed.

Materials and configurations discussed FIGS. 2 A through 2 I are sketches of the general Cable Barrier Reflector Wrap device 31 with features and specific configurations shown. One must quickly realize the configuration of the structure 32 may be of various tubular configurations. For example and not as a limitation the tube may be as a circular or round tube, ovular/elliptical tube, square, rectangular or other polygon-type tube shapes. The component 32 may be comprised of a metal such as steel or aluminum and may be coated with a powder coat, paint, or other surface finish. The preferred material and embodiment of structure 32 is made of a heavy duty, durable plastic or composite material. The plastic may be of various types of simple or reinforced plastic and is a suitable use for re-ground and recycled plastics to permit the product to be considered a "GREEN" product environmentally. The reflective surface 35 anticipates a honeycomb type reflective material—sheet composite, plastic, pressed cardboard and the like with an adhesive backing 33. Alternatively the means 33 to attach the reflective surface 35 to the structure 32 can be a separate adhesive, a heat process to make the surface 35 adhere to the structure 32 or even a molded to the structure 32 as it (the structure 32) is manufactured. In FIG. 2 I, the actual design sketch shows the cable barrier wrap tube 32 is split 37 up the back side for easy attachment to the cable barrier post 40. This split 37 also forms a natural overlap 39 of the cable barrier wrap tube 32 which allows the diameter to be adjusted to the post size 40. A screw 36 or equal can also be placed through the overlap 39 (or the overlap and the barrier post) to secure the cable barrier wrap device 31. The overall length of the device may vary from approximately three (3)

inches to forty-five (45) inches or more in length. This length is an example and not limitation of the device.

FIGS. 3 through 10 are sketches of the general Cable Barrier Reflector Wrap device 31 in use. These are explained in the operation section below.

The details mentioned here are exemplary and not limiting. Other specific components and manners specific to describing a Cable Barrier Reflector Wrap device 31 may be added as a person having ordinary skill in the field of reflective surface devices and their uses well appreciates.

Operation Of The Preferred Embodiment

The Cable Barrier Reflector Wrap device 31 has been described in the above embodiment. The manner of how the device operates is described below. One notes well that the description above and the operation described here must be taken together to fully illustrate the concept of the Cable Barrier Reflector Wrap device 31.

The preferred embodiment is a cable barrier reflector wrap 31 comprised of:
 a. a support structure 32 to support a reflective object 35, the structure having an open end 34 and a slit 37 or aperture longitudinal to the structure 32;
 b. the reflective surface structure 35; and
 c. a means 33 to secure the reflective surface 35 structure to the support structure 32 whereby the cable barrier reflective device 31 is connected to items including a cable barrier system 41, sign posts 40, fences 60 and other barrier structures to improve and enhance the reflectivity and improve the visibility of the items.

FIGS. 3 A (front and back views) and 3 B (side view) are sketches of the general reflective cable wrap device 31 with components and features noted. Here are shown the post 40 on the reflective device 31 with the cables 41 noted.

FIGS. 4 A through 4 D are sketches of the reflective device 31 for a Nucor application with the components and features shown from generally a top view. Again are shown the sketches of the general reflective cable wrap device 31 for Nucor with the posts 40 on the reflective device 31, with the cables 41 noted, and the terrain/ground 55.

FIGS. 5 A through 5 C are sketches of the reflective device 31 for a Gibraltar application. Demonstrated are the sketches of the general reflective cable wrap device 31 for Gibraltar cable system with the posts 40 on the reflective device 31, with the cables 41 noted, and the terrain/ground 55.

FIGS. 6 A through 6 C are sketches of storage companies wrought iron fence, farm fence 60, and highway cable 41 and posts 40 applications.

FIGS. 7 A through 7 D are sketches of the reflective device 31 for a Brifen application. Once again one sees the universality of the system as the sketches of the general reflective cable wrap device 31 for Brifen with the posts 40 on the reflective device 31, with the cables 41 noted, and the terrain/ground 55.

FIGS. 8 A and 8 B are additional applications with Brifen barrier and the device 31 with an entire series 50.

FIGS. 9 A through 9 E are sketches and photos of the reflective device 31 with various fence 60, highway and intersection applications. This again demonstrates how universally the device 31 may be used.

FIGS. 10 A and 10 B are sketches of the reflective device with cable systems without the device 31 and with the device 31. FIG. 10 A shows the reflection 75 from device 31. Gere the initial (closest) device 31 as well as the farther device 31 (away at next post) catches the headlights on the rounded surface 35 of the device 31 and continues to reflect from both positions creating high visibility of the cable system. In FIG. 10 B, the flat reflector closest has limited reflection and the farther post has none since the reflective surface has no headlight impinging on the cable post. Therefore the reflection 70 from post 40 or cable 41 is far less, if at all.

Many uses are anticipated for the Cable Barrier Reflector Wrap device 31. Some examples, and not limitations, are shown in the following Table:

| Item | Description of Use |
|---|---|
| 1 | On various types of cable safety systems and cable barriers |
| 2 | On farm fencing where safety reflection surfaces are desired or needed |
| 3 | On signage posts |
| 4 | On safety bollards |
| 5 | At Outdoor parking areas (temporary or permanent) |
| 6 | On bridges |
| 7 | At railway crossings |
| 8 | At school crossings |

As one skilled in the art of reflection devices will appreciate, these uses may be as Original Installation or Retro-fit in the Field With this description it is to be understood that the Cable Barrier Reflector Wrap device 31 is not to be limited to only the disclosed embodiment of product. The features of the device 31 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A cable barrier post reflector wrap made of a durable material and comprised of:
   a. an essentially tubular support structure to support a reflective object, the tubular structure having an a pair of open ends, a slit or aperture longitudinal to the structure and perpendicular to the open ends, an overlap at the slit, and an opening or gap at the overlap;
   b. a means to connect the slit at the overlap;
   c. a reflective surface secured to the essentially tubular structure; and
   d. a means for securing the reflective surface structure to the support structure and between at least two horizontal cables whereby the cable barrier post reflect or wrap is interposed between the at least two horizontal cables of a cable barrier system to improve and enhance the reflectivity and improve the visibility of the cable barrier system.

2. The device according to claim 1 wherein the means for securing the reflective surface to the support structure is an adhesive.

3. The device according to claim 1 wherein the means for securing the reflective surface to the support structure is a glue.

4. The device according to claim 1 wherein the means for securing the reflective surface to the support structure is a heat seal process.

5. The device according to claim 1 wherein the means to connect the slit at the overlap is a selected from a group consisting of a screw, an adhesive, a tape, and a heat process.

* * * * *